United States Patent
Moro

(10) Patent No.: US 7,307,758 B2
(45) Date of Patent: Dec. 11, 2007

(54) IMAGE FORMING APPARATUS AND IMAGE FORMING METHOD

(75) Inventor: Akihiro Moro, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1025 days.

(21) Appl. No.: 10/293,296

(22) Filed: Nov. 14, 2002

(65) Prior Publication Data

US 2004/0095605 A1 May 20, 2004

(51) Int. Cl.
*G06F 15/00* (2006.01)
*H04N 1/40* (2006.01)

(52) U.S. Cl. .............. 358/2.1; 358/1.9; 358/1.13; 358/1.15; 382/239; 382/176; 382/180

(58) Field of Classification Search ............ 358/1.9, 358/2.1, 1.13, 1.15; 382/239, 176, 180
See application file for complete search history.

(56) References Cited

U.S. PATENT DOCUMENTS

| | | | |
|---|---|---|---|
| 5,786,906 A | 7/1998 | Shishizuka | |
| 5,911,004 A | 6/1999 | Ohuchi et al. | |
| 6,023,526 A | 2/2000 | Kondo et al. | |
| 6,204,933 B1 | 3/2001 | Yoshino et al. | |
| 6,285,458 B1 * | 9/2001 | Yada | 358/1.15 |
| 6,456,403 B1 | 9/2002 | Archer et al. | |
| 2003/0043410 A1 * | 3/2003 | Fukawa et al. | 358/2.1 |

FOREIGN PATENT DOCUMENTS

| | | | |
|---|---|---|---|
| JP | 11-075073 A | | 3/1999 |
| JP | 2000-188689 A | | 7/2000 |
| JP | 2002-103686 A | | 4/2002 |
| JP | 2002-165101 A | | 6/2002 |
| JP | 2002-247290 A | | 8/2002 |
| JP | 2002-247382 A | | 8/2002 |
| JP | 2002247290 A | * | 8/2002 |
| JP | 2002247382 A | * | 8/2002 |

OTHER PUBLICATIONS

A. Moro, U.S. PTO Office Action, U.S. Appl. No. 10/374,721, filed Mar. 23, 2007, 19 pages.
A. Moro, U.S. PTO Office Action, U.S. Appl. No. 10/374,721, Sep. 18, 2007, 12 pages.

* cited by examiner

*Primary Examiner*—King Y. Poon
*Assistant Examiner*—Quang N. Vo
(74) *Attorney, Agent, or Firm*—Foley & Lardner LLP

(57) ABSTRACT

In an image forming apparatus, a control section performs a control to compress/decompress at least one of first image data and second image data by one of a first compression/decompression method and a second compression/decompression method on the basis of the determination of the kind of an original, and to perform one of a first printing operation and a second printing operation.

9 Claims, 7 Drawing Sheets

IMAGE FORMING APPARATUS AND IMAGE FORMING METHOD

BACKGROUND OF THE INVENTION

1. Field of the Invention

The present invention relates to an image forming apparatus and method, and more particularly to an image forming apparatus and method for performing printing by subjecting image data of an original obtained by a scanner, etc. to image processing.

2. Description of the Related Art

In these years, some types of color digital copying machines have automatic color select functions (ACS).

Jpn. Pat. Appln. KOKAI Publication No. 2002-165101, for instance, discloses an image forming apparatus having a color determination section that determines whether an original scanned by a color CCD sensor is a black-and-white one or a color one, and a setting section that sets a black-and-white/color mode for image formation on the basis of the determination. In the prior-art techniques including this one, the black-and-white/color determination can be made by the ACS. However, it is not possible to subject a black-and-white character original and a black-and-white photo original to different processes. As regards a photo original, a gray-scale process is important for the image quality. However, a gray-scale process is not important for the image quality in the case of a character original. Accordingly, if a character original is subjected to a process that places priority on speed, and not on gray-scale processing, productivity will be enhanced.

BRIEF SUMMARY OF THE INVENTION

There is a need for an image forming apparatus and method that can achieve suppression in degradation of image quality and enhancement of productivity at the same time, by performing automatic determination of the kind of an original and processing image data through an image processing section provided in accordance with the determined kind of original.

According to an aspect of the present invention, there is provided an image forming apparatus comprising: a first processing section that subjects image data to a first process, and outputs first image data that has been subjected to the first process; a second processing section that subjects image data to a second process, and outputs second image data that has been subjected to the second process; a compression/decompression section that compresses/decompresses at least one of the first image data and the second image data by one of a first compression/decompression method and a second compression/decompression method; a printer section that performs one of a first printing operation and a second printing operation; a determination section that determines a kind of an original; and a control section. The control section performs a control to compress/decompress at least one of the first image data and the second image data by one of the first compression/decompression method and the second compression/decompression method on the basis of the determination by the determination section, and to perform one of the first printing operation and the second printing operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
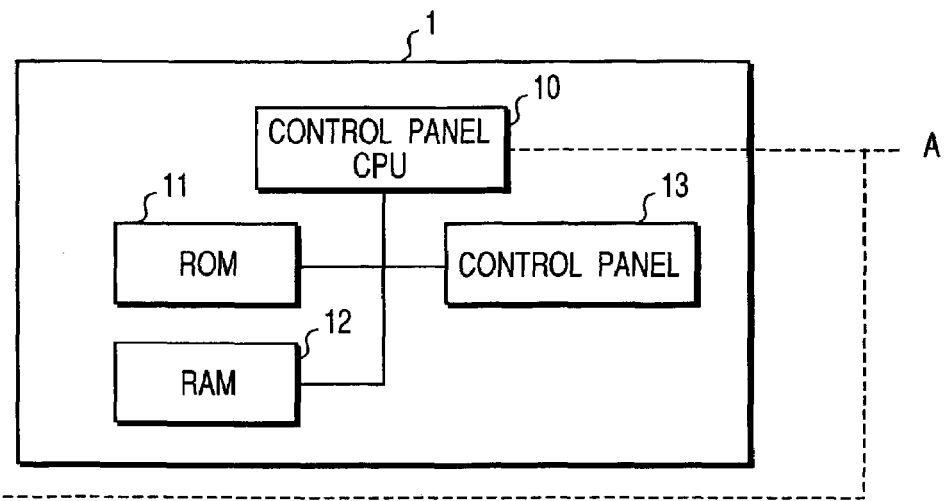
FIG. 1 is a control block diagram of a control panel section according to an embodiment of the invention.
Figure 2:
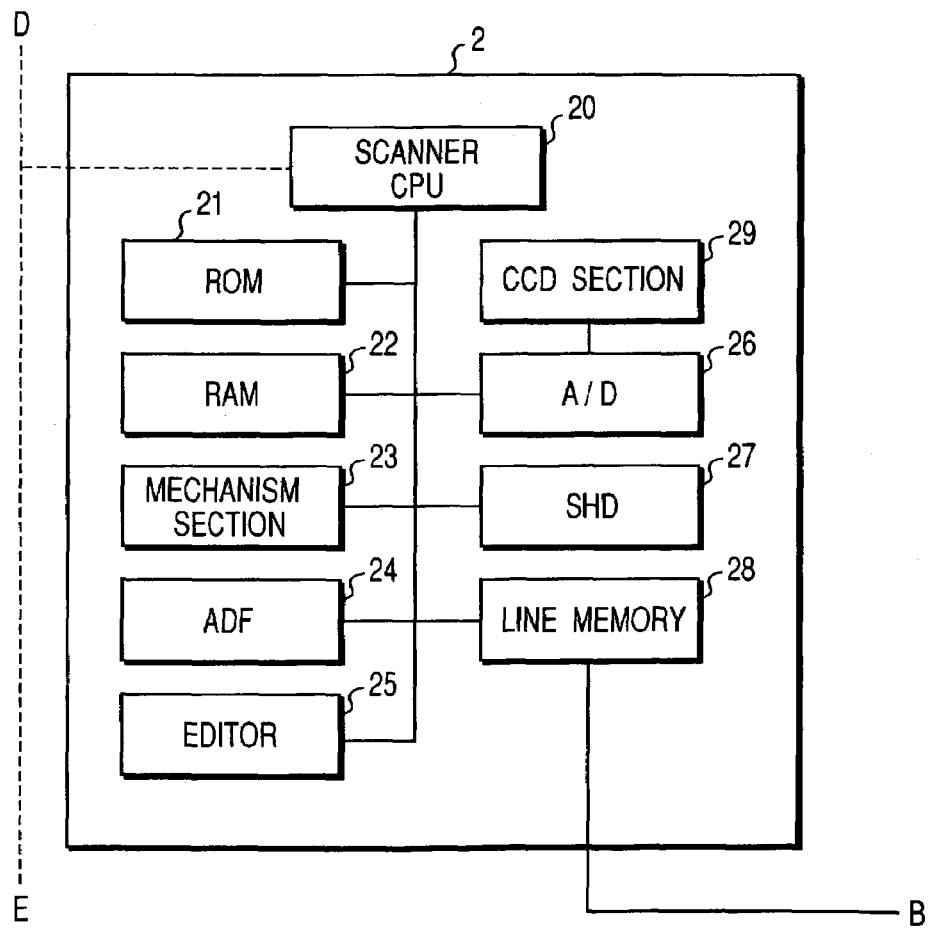
FIG. 2 is a control block diagram of a scanner section according to the embodiment.
Figure 3:
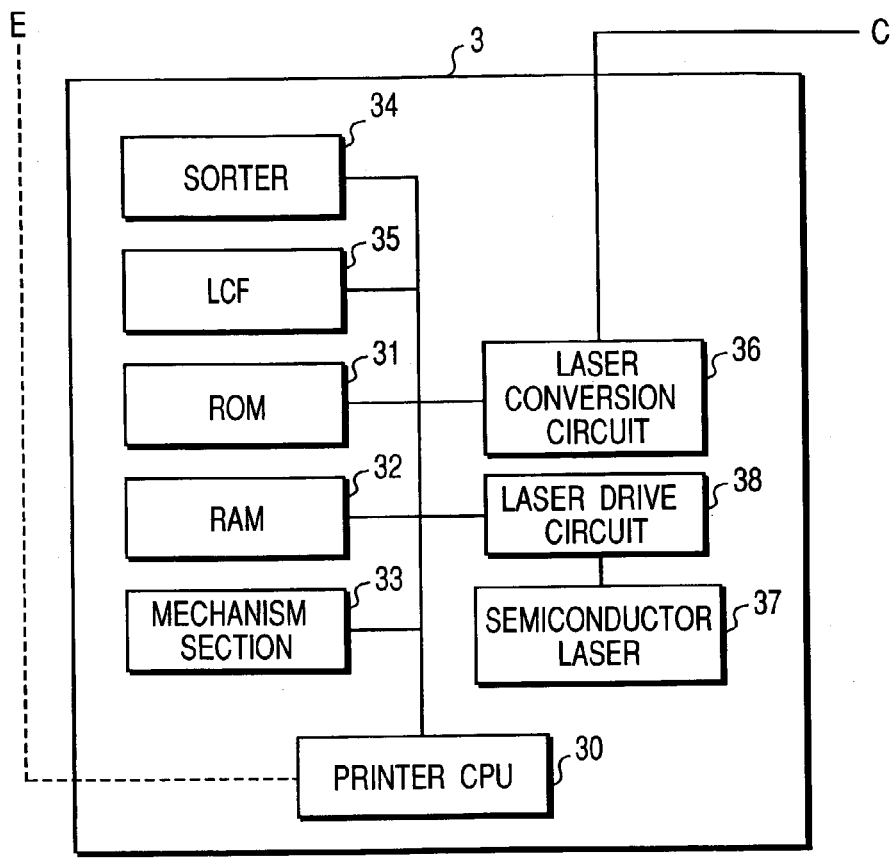
FIG. 3 is a control block diagram of a printer section according to the embodiment.

An embodiment of the present invention will now be described with reference to the accompanying drawings. In the embodiment, this invention is applied to a color digital copying machine.

FIGS. 1 to 4 show control blocks of the color digital copying machine. The color digital copying machine has a main CPU 40 (control unit), a control panel CPU 10, a scanner CPU 20 and a printer CPU 30. These CPUs control a basic processing unit 4, a control panel section 1, a scanner section 2 and a printer section 3, respectively. The main CPU 40 communicates with the control panel CPU 10, scanner CPU 20 and printer CPU 30 and controls the same.

The control panel CPU 10 is connected to a ROM 11 and a RAM 12. Based on data stored in the ROM 11 and RAM 12, the control panel CPU 10, for example, detects operations of switches on the control panel 13, turns on/off LEDs on the control panel 13, and controls a display on the control panel 13.

Figure 4:
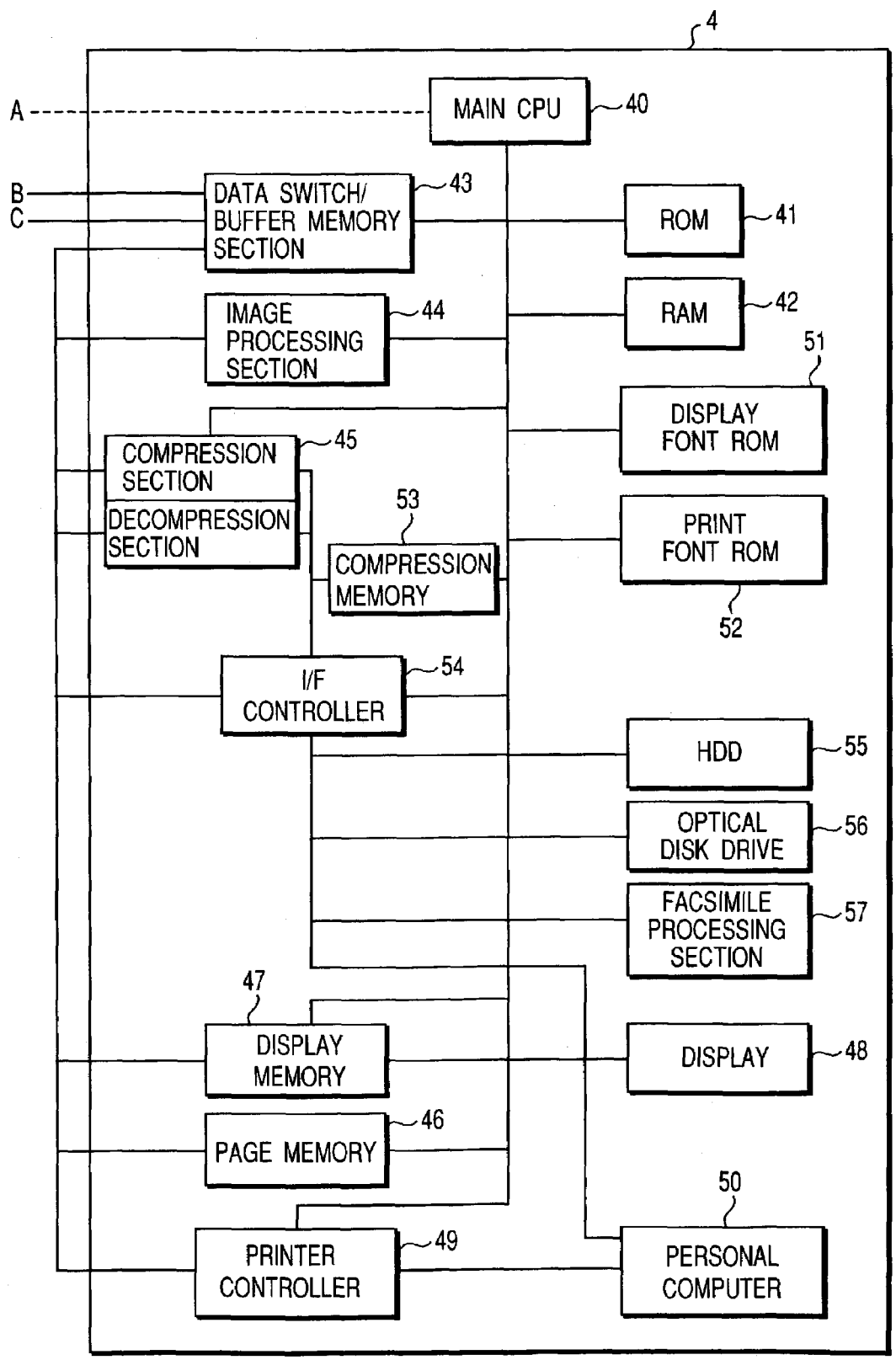
FIG. 4 is a control block diagram of a basic processing unit according to the embodiment.

Based on data stored in a ROM 21 and RAM 22, the scanner CPU 20 controls a mechanism section 23 including a motor, a solenoid, etc. (not shown), and also controls an automatic document feeder (ADF) 24, a coordinate input device (editor) 25, an analog/digital converter circuit (A/D) 26, a shading correction circuit (SHD) 27 and a line memory 28. A CCD section 29 is connected to the A/D converter 26. The CCD section 29 scans an image by means of a monochromatic CCD sensor and a color CCD sensor. As is shown in FIG. 4, an image scanned by the monochromatic CCD sensor is processed by a monochromatic CCD scan processing section 291, and an image scanned by the color CCD sensor is processed by a color CCD scan processing section 292. The monochromatic CCD sensor that scans an original to produce a corresponding monochromatic image has a higher scan speed and a higher resolution than the color CCD sensor that scans an original to produce a corresponding color image.

On the basis of data stored in a ROM 31 and a RAM 32, the printer CPU 30 controls a mechanism section 33 including a motor, a solenoid, etc. (not shown), and also controls a sorter 34, a large cassette feeder (LCF) 35, a laser conversion circuit 36, and a laser drive circuit 38 that controls a semiconductor laser 37.

The main CPU 40 controls the entirety of the color digital copying machine according to control programs stored in a ROM 41 and a RAM 42. The ROM 41 stores various parameters to be used at the time of image processing.

A data switch/buffer memory section 43 effects switching as to where data scanned by the scanner section 2 is to be sent, and which data is to be sent to the printer section 3. In addition, the data switch/buffer memory section 43 performs buffering. Details of the structure and operation of an imaging processing section 44 will be described later. The imaging processing section 44 is provided with, for example, circuits for generating histograms from image data and correcting the image data based on the histograms. A compression/decompression section 45 compresses/decompresses image data. A page memory 46 stores image data in units of a page. A display memory 47 stores image data to be displayed on a display 48. A printer controller 49 develops code data from a personal computer 50 into image data. A display font ROM 51 develops code data onto the display memory 47. A print font ROM 52 develops code data onto the page memory 46. A compression memory 53 stores data compressed by the compression/decompression section 45.

The main CPU 40 is also connected via an I/F controller 54 to a hard disk drive (HDD) 55, an optical disk drive 56 and a facsimile processing section 57. The HDD 55 stores various programs, such as OCR automatic recognition software, for performing character recognition on the basis of the data stored in the page memory. The facsimile processing section 57 forwards processed image data to an external communication line (not shown) connected to the present copying machine, or receives image data from the external communication line.

In the color digital copying machine with the above structure, image data scanned by the scanner section 2 is subjected to image processing in the image processing section 44. Based on the processed image data, the printer section 3 performs image formation.

Figure 5:
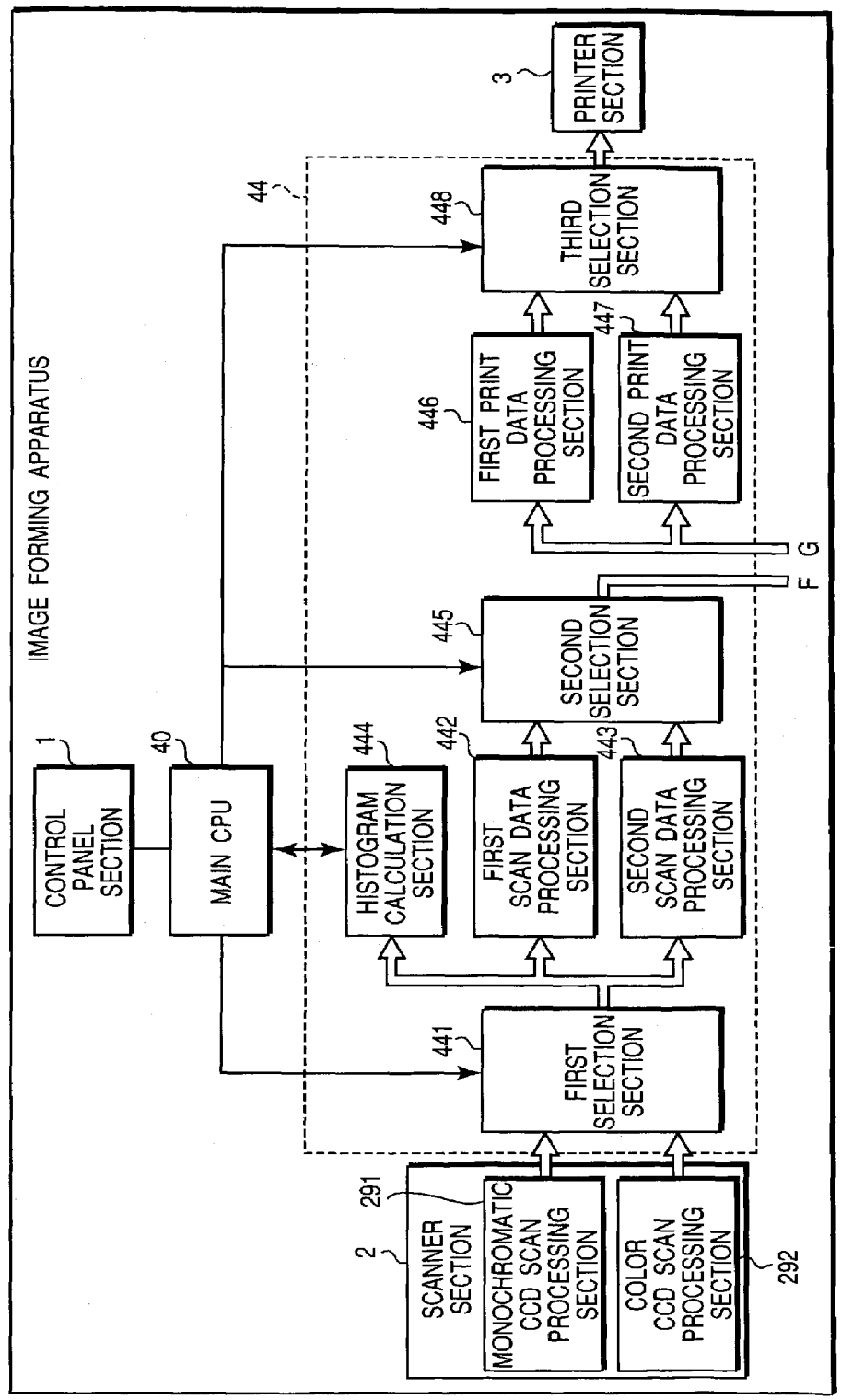
FIG. 5 schematically shows the structure of an image processing section according to the embodiment.

The image processing section 44 will now be described with reference to the control block diagram of FIG. 5. In FIG. 5, double-line arrows indicate flows of image data scanned by the scanner section 2, which is to be output to the printer section 3 via the image processing section 44.

Image data scanned by the monochromatic CCD sensor and subjected to correction processing in the monochromatic CCD scan processing section 291, or image data scanned by the color CCD sensor and subjected to correction processing in the color CCD scan processing section 292, is input to a first selection section 441. At the time of scan, the image data selected by the first selection section 441 is delivered to either a first scan data processing section 442 or a second scan data processing section 443. At the time of pre-scan, the image data selected by the first selection section 441 is delivered to a histogram calculation section 444. How the first selection section 441 selects output image data at the time of scan will be described later.

The first scan data processing section 442 (first processing section) subjects the monochromatic image data input from the monochromatic CCD scan processing section 291 to filtering processing, to density adjustment processing, and to gray-scale processing using an error diffusion process that is a pseudo-half tone process. In other words, the first scan data processing section 442 performs processes that place priority on a processing speed (V1). For this purpose, the processing section 442 decreases the amount of image data to a lower bit (M bit) than in the second scan data processing section 443 in front of the compression/decompression section 45. These processes achieve handling for shortening an access time to the page memory 46 to realize electronic sorting, and achieve effective use of OCR automatic recognition software.

The second scan data processing section 443 (second processing section) subjects RGB color image data input from the color CCD scan processing section 292 to color conversion processing, filtering processing and density adjustment processing. The processing section 443 also subjects monochromatic image data input from the monochromatic CCD scan processing section 291 to color conversion processing, filtering processing and density adjustment processing. In other words, the second scan data processing section 443 performs processes that place priority on image quality, and not on a processing speed (V2, V1>V2). Specifically, the processing section 443 prioritizes gray-scale reproducibility as in the case of color images and monochromatic photo images, and makes the amount of image data greater than in the first scan data processing section 442 (N bit, N>M) in front of the compression/decompression section 45.

Various parameters used for the color conversion, filtering and density adjustment in the second scan data processing section 443 are stored in the ROM 41 in association with monochromatic image data and color image data, respectively. Such parameters are selected, as needed, by the main CPU 40 on the basis of, e.g. the kind of each page of original documents. As regards the processing sections other than the processing section 443, various parameters are similarly stored in the ROM 41 and selected by the main CPU 40, as needed.

Image data processed by the first scan data processing section 442 and second scan data processing section 443 is output to a second selection section 445. How the second selection section 445 selects output image data will be described later. Image data from the second selection section 445 is output to the compression/decompression section 45.

Figure 6:
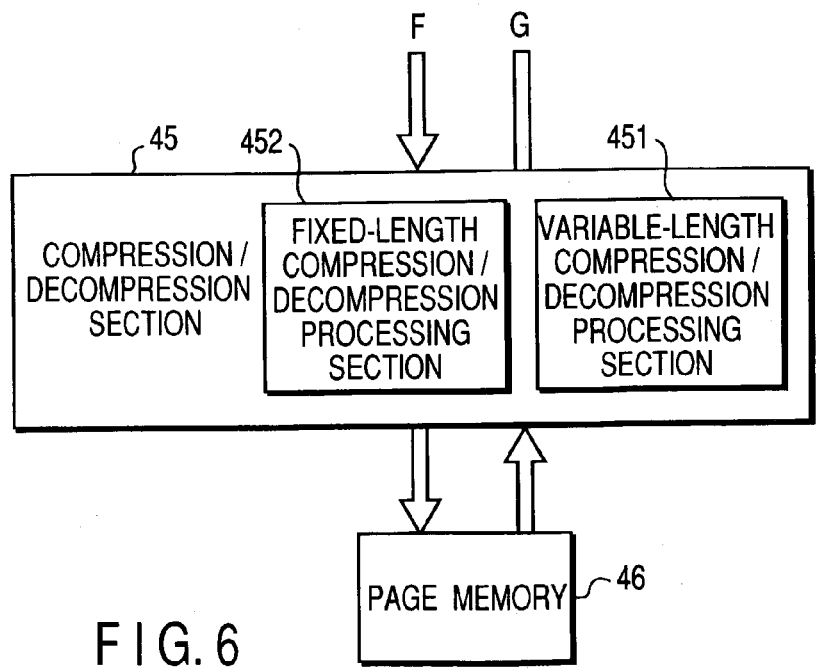
FIG. 6 shows a compression/decompression section and a page memory according to the embodiment.

As is shown in FIG. 6, when monochromatic-character image data has been input to the compression/decompression section 45, a variable-length compression/decompression processing section 451 is selected to process the image data. When color image data and monochromatic-photo image data has been input to the compression/decompression section 45, a fixed-length compression/decompression processing section 452 for color data and the variable-length compression/decompression processing section 451 are both selected to process the image data. For example, color image data is compressed by the fixed-length compression/decompression processing section 452 and then further compressed by the variable-length compression/decompression processing section 451. The selection of each processing section 451, 452 is made by the control of the main CPU 40 in accordance with the kind of each page of originals.

Data compressed by the compression/decompression section 45 is temporarily stored in the page memory 46. Then, the data is decompressed by the compression/decompression section 45. The decompressed data is input to a first print data processing section 446 and a second print data processing section 447.

The first print data processing section 446 (third processing section) performs a gray-scale process that places priority on a processing speed and is suitable for low-bit (M-bit) image data from the first scan data processing section 442. The first print data processing section 446 subjects the input image data to a smoothing process and a monochromatic multi-value process and outputs the resultant image data to the printer section 3.

The second print data processing section 447 (fourth processing section) performs a gray-scale process that places priority on an image quality and is suitable for greater-number bit (N-bit, N>M) data than in the first print data processing section 446. The second print data processing section 447 subjects the input image data to a black-adding process and a gray-scale process and to a color multi-value process and outputs the resultant image data to the printer section 3.

Various parameters used for the black-adding process and gray-scale process performed in the second print data processing section 447 are stored in the ROM 41. The various parameters are selected by the control of the main CPU 40. In the case of image data of a monochromatic photo original, the main CPU 40 sets parameters for monochromatic processing. In the case of image data of a color original, the main CPU 40 sets parameters for color processing.

The image data processed by the first print data processing section 446 and second print data processing section 447 is output to a third selection section 448. How the third selection section 448 selects output image data will be described later. The image data from the third selection section 448 is output to the printer section 3.

The printer section 3 performs a color printing operation in the case of color image data and monochromatic photo image data, and performs a monochromatic printing operation in the case of monochromatic character image data. This selection is effected by a communication control from the main CPU 40 to the printer CPU 30 in accordance with the kind of each page of originals.

The histogram calculation section 444 calculates histogram information of an original on the basis of image data pre-scanned by the color CCD scan processing section 292. For example, input image data (0 to 255) is divided by a predetermined number, e.g. 8, and the frequency of RGB data in each divided data area is calculated. The frequency in each divided data area is read by the main CPU 40 to determine the kind of original. The determination of the kind of original is determined on the basis of the frequency variance of RGB data and the frequency ratio among the respective divided data areas. For example, the determination is effected as follows.

Figure 7:
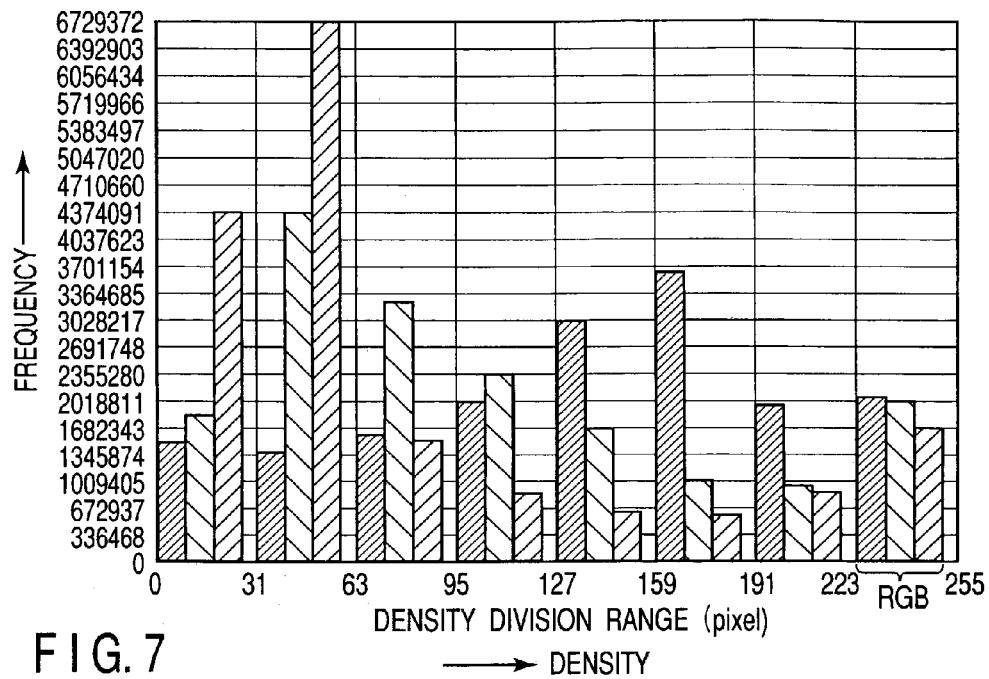
FIG. 7 is a histogram showing a density and a frequency relating to a color original in the embodiment.
Figure 8:
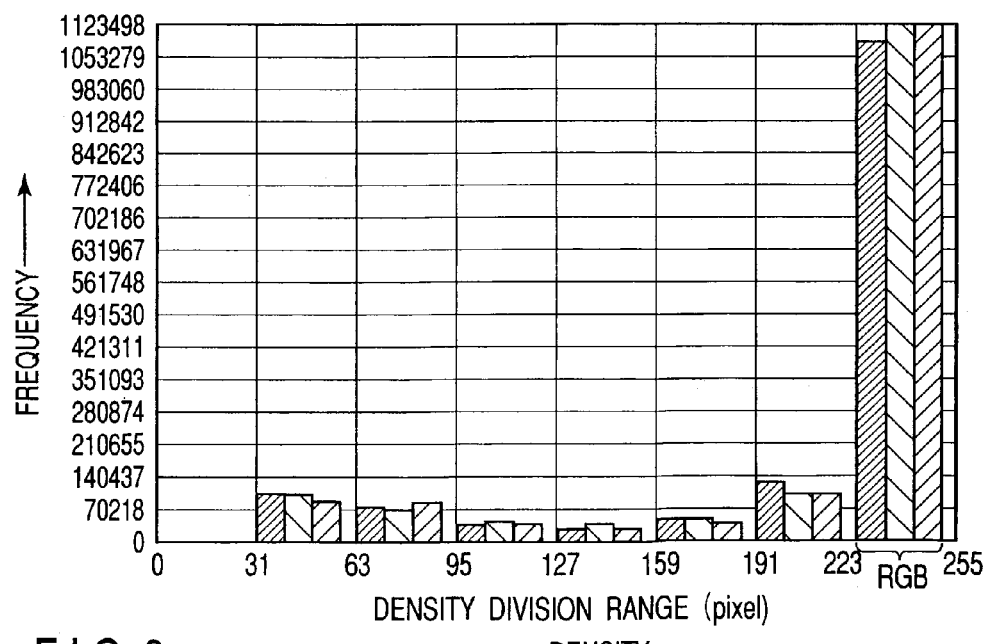
FIG. 8 is a histogram showing a density and a frequency relating to a monochromatic character original in the embodiment.
Figure 9:
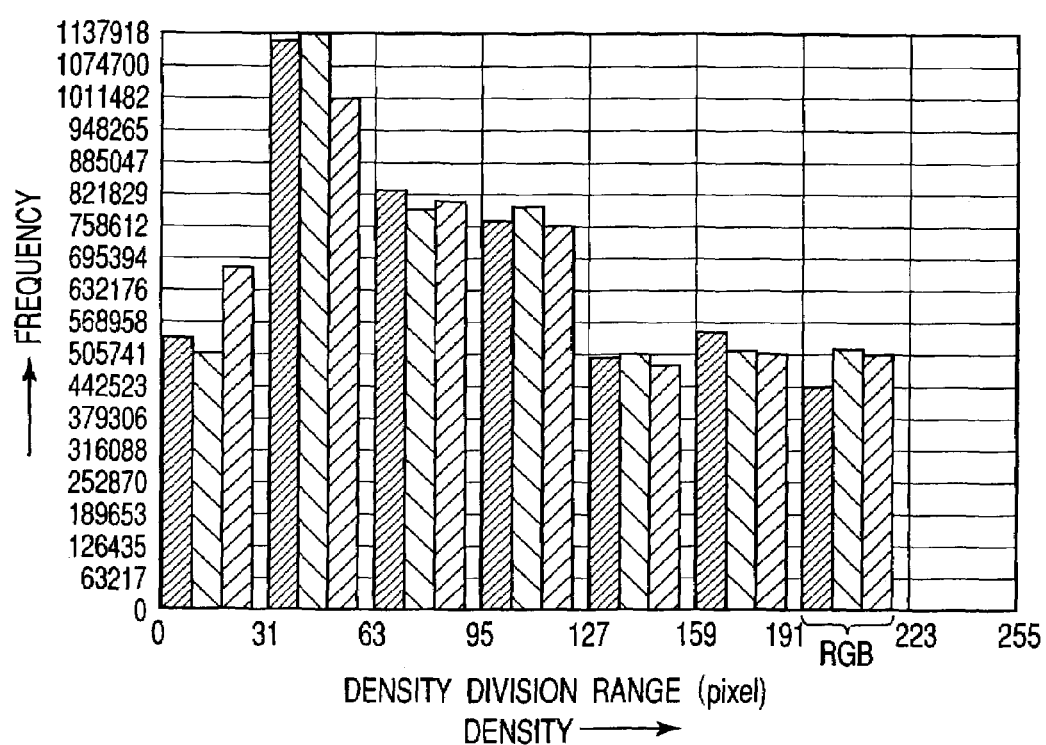
FIG. 9 is a histogram showing a density and a frequency relating to a monochromatic photo original in the embodiment.
Figure 10:
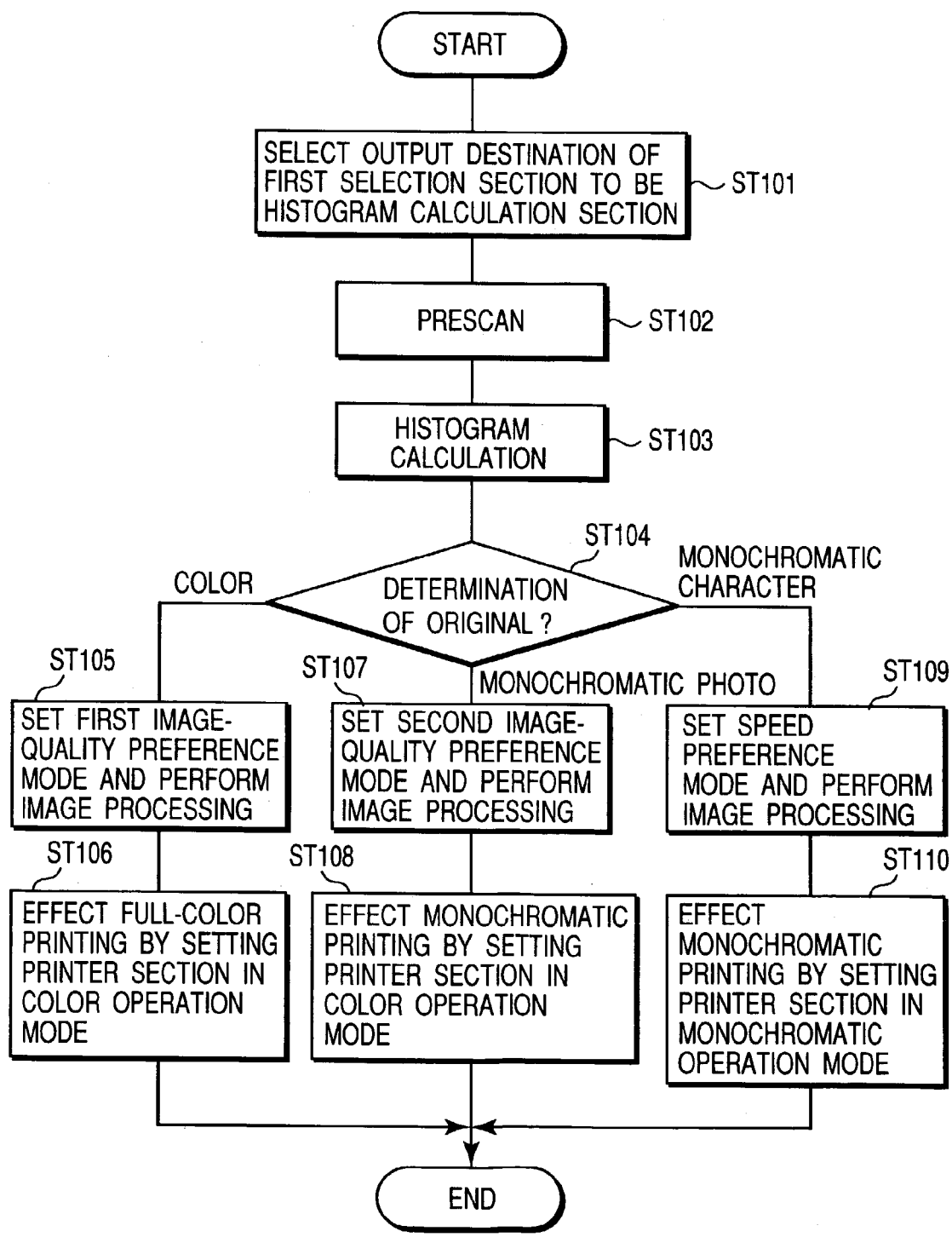
FIG. 10 is a flow chart illustrating a process of a copying operation in the embodiment.

FIG. 7 illustrates a determination result of a color original, which is obtained by the main CPU 40. In FIG. 7, the variance in frequency of RGB data in each divided data area is greater than a predetermined threshold A. FIG. 8 illustrates a determination result of a monochromatic character original, which is obtained by the main CPU 40. In FIG. 8, the variance in frequency of RGB data in each divided data area is not greater than the threshold A. In addition, the frequency in a high-density side divided data area (8th divided data area) is greater than a threshold B and the frequency in the other divided data areas is not greater than the threshold. FIG. 9 illustrates a determination result of a monochromatic photo original, which is obtained by the main CPU 40. In FIG. 9, the variance in frequency of RGB data in each divided data area is not greater than threshold A, and there are a plurality of divided data areas, which have a frequency greater than a threshold C.

Based on the determination result of each page of originals, which is obtained by the histogram calculation section 444, the main CPU 40 controls the first selection section 441, second selection section 445 and third selection section 448 and makes selection of output image data from each selection section. In addition, based on the determination result of each page, the main CPU 40 selects parameters to be set in the second scan data processing section 443, compression/decompression section 45 and second print data processing section.

When the main CPU 40 has determined a color original, it sets a first image-quality preference mode as an image data processing mode, which places priority on color reproduction. In the first image-quality preference mode, the selection sections 441, 445 and 448 are operated to make effective the output results from the color CCD scan processing section 292, second scan data processing section 443 and second print data processing section 447. In this case, the main CPU 40 controls the printer CPU 30 to effect full-color printing in a color operation mode.

When the main CPU 40 has determined a monochromatic photo original, it sets a second image-quality preference mode as an image data processing mode, which places priority on monochromatic-photo reproduction. In the second image-quality preference mode, the selection sections 441, 445 and 448 are operated to make effective the output results from the monochromatic CCD scan processing section 291, second scan data processing section 443 and second print data processing section 447. In this case, the main CPU 40 controls the printer CPU 30 to effect monochromatic printing in a color operation mode.

In the second image-quality preference mode, the output from the monochromatic CCD sensor is used. Thus, the scan of the original may be performed in accordance with the scan speed of the monochromatic CCD sensor. Thereby, the scan time can be made shorter than in the first image-quality preference mode using the output of the color CCD sensor. In addition, in this case, since the image data obtained from the monochromatic CCD scan section 291 is used, it is possible to prevent disadvantages in resolution, such as thinning in characters and lines, which may occur when using the image data obtained by the color CCD scan processing section 292.

When the main CPU 40 has determined a monochromatic character original, it sets a speed preference mode as an image data processing mode, which places priority on a processing speed with the amount of data reduced. In the speed preference mode, the selection sections 441, 445 and 448 are operated to make effective the output results from the monochromatic CCD scan processing section 291, first scan data processing section 442 and first print data processing section 446. In this case, the main CPU 40 controls the printer CPU 30 to effect monochromatic printing in a monochromatic operation mode.

In this case, like the second image-quality preference mode, the output from the monochromatic CCD sensor is used. Thus, a high-speed scan operation can be achieved.

Referring to a flow chart of FIG. 9, a description will now be given of an example of control at the time the color digital copying machine produces a copy in an automatic original determination mode.

To start with, in step ST101, the main CPU 40 sets the first selection section 441 such that an output destination of image data is selected to be the histogram calculation section 444. In step ST102, the main CPU 40 performs prescan. Specifically, an image of an original is scanned by the color CCD sensor, and the scanned image data is processed by the color CCD scan processing section 292. The resultant data is output to the histogram calculation section 444.

In step ST103, the histogram calculation section 444 calculates the frequency of RGB pixels of the input image data in a predetermined number of divided image data areas. The predetermined number is 8, for instance.

In step ST104, the main CPU determines the kind of original on the basis of the result from the histogram calculation section 444. As mentioned above, the determination is made based on the frequency variance of RGB data and the frequency ratio among the divided areas. If a color original is determined, the process advances to step ST105. If a monochromatic photo original is determined, the process advances to step ST107. If a monochromatic character original is determined, the process advances to step ST109.

In step ST105, the above-described first image-quality preference mode is set as an image processing mode. Based on this setting, output image data from the respective selection sections and parameters are selected, and image processing is carried out. In step ST106, the main CPU 40 controls the printer CPU 30 based on the processed image data, and the printer section 3 is operated to effect full-color printing in a color operation mode.

In step ST107, the above-described second image-quality preference mode is set as an image processing mode. Based on this setting, output image data from the respective selection sections and parameters are selected, and image processing is carried out. In step ST108, the main CPU 40 controls the printer CPU 30 based on the processed image data, and the printer section 3 is operated to effect monochromatic printing in the color operation mode. Then, the process is completed.

In step ST109, the above-described speed preference mode is set as an image processing mode. Based on this setting, the respective selection sections are operated, and image processing is carried out. In step ST110, the main CPU 40 controls the printer CPU 30 based on the processed image data, and the printer section 3 is operated to effect monochromatic printing in a monochromatic operation mode. Then, the process is completed.

In this example of control, one copy has been produced. When originals are to be successively scanned and copied by means of the ADF 24, the above-described operation may be repeated in accordance with the number of originals.

A description will now be given of the operation of the color digital copying machine at the time a monochromatic photo original is to be copied in the automatic original determination mode.

The user places a monochromatic photo original on an original table (not shown). The user then operates the control panel 13 to start a prescan operation in the automatic original determination mode.

The monochromatic photo original is determined by a calculation result of the histogram calculation section 444 based on the image data scanned by the prescan operation. The calculation result is that the variance in frequency of RGB data in each of divided data areas divided by a predetermined number (e.g. 8) is not greater than the threshold A and there are divided data areas, which have a frequency greater than threshold C.

Since the monochromatic photo original has been determined, the second image-quality preference mode is set. Specifically, the first selection section 441 selects the output result from the monochromatic CCD scan processing section 291, the second selection section 445 selects the output result of the second scan data processing section 443, and the third selection section 448 selects the output result of the second print data processing section 447. At this time, the main CPU 40 selects parameters corresponding to monochromatic image data.

Specifically, such setting is effected that the image data from the monochromatic CCD scan processing section 291 is subjected to a color conversion process for monochromatic data in the second scan data processing section 443, and the data, which has been subjected to filtering and density adjustment, is compressed and decompressed in both the variable-length compression/decompression processing section 451 and fixed-length compression/decompression processing section 452 of the compression/decompression section 45. The processed data is then stored in the page memory 46.

The image data from the page memory 46, which has been decompressed by the compression/decompression section 45, is subjected to monochromatic multi-value processing such as black-adding processing and grayscale processing in the second print data processing section 447 in which parameters for monochromatic processing have been set. The processed data is then output to the printer section 3.

The printer section 3 performs monochromatic printing in the color operation mode on the basis of the input image data. Thereby, a copy of the monochromatic photo original is produced. Accordingly, the color digital copying machine can realize copying of a monochromatic image with high image quality, without sacrificing the resolution for thin characters, thin lines, etc.

The color digital copying machine of this embodiment performs the prescan in order to determine the kind of each page of originals to be one of a color original, a monochromatic photo original and a monochromatic character original. Based on the determination result, the copying machine sets one of the first image-quality preference mode, second image-quality preference mode and speed preference mode. In addition, in accordance with the kind of original, the copying machine selects the processing sections provided in the image processing section 44, thereby carrying out an image data process and a compression/decompression process, and reducing the amount of data in the page memory 46. Therefore, this copying machine can enhance productivity while suppressing degradation in image quality.

For example, where the image processing section is constructed such that the second scan data processing section 443 performs the image processing using both image data from the monochromatic CCD scan processing section 291 and color CCD scan processing section 292, the following structure may be adopted. That is, when the original has been determined to be a color one or monochromatic photo one, the first selection section 441 may output both image data from the monochromatic CCD scan processing section 291 and color CCD scan processing section 292 to the second scan data processing section 443. In short, unlike the embodiment, the image data to be output from the first selection section 441 and second selection section 445 may not be selected to be one image data.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image forming apparatus, comprising:
    a determination section which determines a kind of an original to be one of a color original, a monochromatic photo original and a monochromatic character original;
    a mode setting section which sets a first image-quality preference mode that places higher priority on image quality than on a processing speed of an image data when the kind of the original is determined to be the color original, sets a second image-quality preference mode that places higher priority on the image quality than on the processing speed of the image data when the kind of the original is determined to be the monochromatic photo original, and sets a processing speed preference mode that places higher priority on the processing speed of image data than the image quality when the kind of the original is determined to be the monochromatic character original;
    a first processing section which is input the image data of the original, subjects the input image data to an M-bit process at a first processing speed V1, and outputs a first image data, in the processing speed preference mode;
    a second processing section which is input the image data of the original, subjects the input image data to an N-bit (M<N) process at a second processing speed V2(V1>V2), and outputs a second image data, in the first and second image-quality preference modes;
    a compression/decompression section which is input the first image data and processes the input first image data in a first compression/decompression method, in the processing speed preference mode, and is input the second image data and processes the input second image data in a second compression/decompression method, in the first and second image-quality preference modes;
    a parameter setting section which sets a parameter necessary for the processes of the first processing section and the second processing section, in accordance with the mode set by the mode setting section;
    a histogram calculation section that generates a histogram from the data of the original to cause the determination section to determine the kind of original based on the histogram;
    a color CCD scan processing section that processes color image data acquired from a color CCD sensor; and
    a monochromatic CCD scan processing section that processes monochromatic image data acquired from a monochromatic CCD sensor;
    wherein a control section selects, based on said determination, the image data processed by at least one of the color CCD scan processing section and the monochromatic CCD scan processing section and delivers the selected image data to the first processing section and the second processing section.

2. An image forming apparatus according to claim 1, wherein the first compression/decompression method carries out a fixed-length coding compression/decompression process, and the second compression/decompression method carries out the fixed-length coding compression/decompression process and a variable-length coding compression/decompression process that is variable according to the kind of original.

3. An image forming apparatus according to claim 1, further comprising a first selecting section which selects one of a monochromatic data and color data, and a second selecting section which select one of the first image-quality preference mode, the second image-quality preference mode and the processing speed preference mode.

4. An image forming apparatus, comprising:
    a determination section which determines a kind of an original to be one of a color original, a monochromatic photo original and a monochromatic character original;
    a mode setting section which sets a first image-quality preference mode that places higher priority on image quality than on a processing speed of an image data when the kind of the original is determined to be the color original, a second image-quality preference mode that places higher priority on the image quality than on the processing speed of the image data when the kind of the original is determined to be the monochromatic photo original, and a processing speed preference mode that places higher priority on the processing speed of the image data than the image quality when the kind of the original is determined to be the monochromatic character original;
    a first processing section which input the image data of the original, subjects the input image data to an M-bit process at a first processing speed V1, and outputs a first image data, in the processing speed preference mode;
    a second processing section which is input the image data of the original, subjects the input image data to an N-bit (M<N) process at a second processing speed V2(V1>V2), and outputs a second image data, in the first and second image-quality preference modes;
    a compression/decompression section which is input the first image data and processes the input first image data in a first compression/decompression method, in the processing speed preference mode, and is input the second image data and processes the input second image data in a second compression/decompression method, in the first and second image-quality preference modes;
    a third processing section which is input the first image data subjected to the first compression/decompression, subjects the input first image data to halftone processing that places priority on the processing speed, and outputs a third image data, in the processing speed preference mode;
    a fourth processing section which is input the second image data subjected to the second compression/decompression, subjects the input second image data to halftone processing that places priority on the image quality, and outputs a fourth image data, in the first and second image-quality preference modes;
    a parameter setting section which sets a parameter necessary for the processes of the first processing section and the second processing section, in accordance with the mode set by the mode setting section;
    a printer section which performs a monochromatic operation and a color operation, and which executes a monochromatic printing by the monochromatic operation in accordance with the third image data in the processing speed preference mode, executes a full-color printing by the color operation in accordance with the fourth image data in the first image-quality preference mode and executes the monochromatic printing by the color operation in accordance with the fourth image data in the second image-quality preference mode;

a histogram calculation section that generates a histogram from the data of the original to cause the determination section to determine the kind of original based on the histogram;

a color CCD scan processing section that processes color image data acquired from a color CCD sensor; and a monochromatic CCD scan processing section that processes monochromatic image data acquired from a monochromatic CCD sensor;

wherein a control section selects, based on said determination, the image data processed by at least one of the color CCD scan processing section and the monochromatic CCD scan processing section and delivers the selected image data to the first processing section and the second processing section.

5. An image forming apparatus according to claim 4, further comprising a first selecting section which selects one of a monochromatic data and color data, a second selecting section which select one of the first image-quality preference mode, the second image-quality preference mode and the processing speed preference mode, and a third selecting section which selects one of a monochromatic printing and a color printing.

6. An image forming apparatus according to claim 4, wherein the first compression/decompression method carries out a fixed-length coding compression/decompression process, and the second compression/decompression method carries out the fixed-length coding compression/decompression process and a variable-length coding compression/decompression process that is variable according to the kind of original.

7. An image forming method, comprising:

determining a kind of an original to be one of a color original, a monochromatic photo original and a monochromatic character original;

setting a first image-quality preference mode that places higher priority on image quality than on a processing speed of an image data when the kind of the original is determined to be the color original, setting a second image-quality preference mode that places higher priority on the image quality than on the processing speed of the image data when the kind of the original is determined to be the monochromatic photo original, and setting a processing speed preference mode that places higher priority on the processing speed of image data than the image quality when the kind of the original is determined to be the monochromatic character original;

setting a parameter in accordance with one of the first image-quality preference mode, the second image-quality preference mode and the processing speed preference mode;

in the processing speed preference mode, subjecting the image data to an M-bit process at a first processing speed V1 based on the parameter and outputting a first image data, and in the first and second image-quality preference modes, subjecting the image data to an N-bit (M<N) process at a second processing speed V2(V1>V2) based on the parameter and outputting a second image data;

processing the first image data in a first compression/decompression method in the processing speed preference mode, and processing the second image data in a second compression/decompression method in the first and second image-quality preference modes;

calculating a histogram from input data of the original to cause the kind of original to be determined based on the histogram; and inputting, based on the determination, at least one of color image data subjected to a predetermined process and monochromatic image data subjected to a predetermined process.

8. A method according to claim 7, further comprising outputting, on the basis of the determination, at least one of third image data obtained by subjecting the decompressed data to a third image process and fourth image data obtained by subjecting the decompressed data to a fourth process.

9. A method according to claim 7, wherein the first compression/decompression method carries out a fixed-length coding compression/decompression process, and the second compression/decompression method carries out the fixed-length coding compression/decompression process and a variable-length coding compression/decompression process that is variable according to the kind of original.

* * * * *